United States Patent Office 2,863,848
Patented Dec. 9, 1958

2,863,848

POLYMERS CONTAINING HEXACHLOROCYCLO-PENTADIENE AND PROCESS OF MAKING SAME

Paul Robitschek, Wilson, and Claude Thomas Bean, Niagara Falls, N. Y., assignors to Hooker Chemical Corporation, Niagara Falls, N. Y., a corporation of New York No Drawing. Application August 9, 1956
Serial No. 603,175

19 Claims. (Cl. 260—45.4)

This invention relates to a new process which comprises reacting a hexahalocyclopentadiene with high molecular weight or polymeric materials containing aliphatic carbon-to-carbon unsaturation and to the products resulting therefrom.

This application is a continuation-in-part of our copending application Serial Number 308,921, filed September 10, 1952, issued January 29, 1957, Patent No. 2,779,701.

The production of infusible, insoluble polyester resins which are flame retardant and have high resistance to heat is of considerable commercial importance. For instance, castings, moldings, foamed articles or laminated structures bonded by polyester type resins are for many uses required, or at least desired, to be resistant to fire, and are also required to endure heat without deterioration. Typical illustrations of applications having such requirements is had in castings for live electrical contacts which must not be ignited by sparks or be deteriorated by heat generated therein. Structural members, such as pipes, wall-coverings, panels, ash trays, etc., are further illustrations where flame retardance is desirable.

Heretofore certain chemical adducts have been disclosed as being useful in the preparation of ester resins. For example, it is known that the maleic acid-cyclopentadiene Diels-Alder adduct resulting from the diene synthesis and its reaction products with alpha, beta-unsaturated dicarboxylic acids or anhydrides and glycols form resinous compositions which may be made insoluble and infusible by further reaction with copolymerizable olefins to form a cross-linked polymer. Such compositions are chemically different from the products of this invention because the double bond remaining in the linear unsaturated polyester so produced is highly reactive and can enter directly into the cross-linking reaction, whereas, the corresponding linkage in the halogen-containing derivatives employed in making the compositions of this invention is non-reactive in said copolymerization reaction; moreover, they do not possess flame retardance. Attempts have been made to impart flame retardance to such hydrocarbon type resinous polyester compositions by incorporating therein inert fire-proofing agents such as antimony oxide or chlorinated paraffin wax as fillers which do not enter into chemical reaction with the components of the resin; however, this results in a loss in the desirable properties, particularly with respect to heat resistance, which are usually associated with polyester resins, and the property to produce satisfactory articles of commerce may be seriously impaired. Other attempts to impart flame retardance are also known which involve chemically combining tetrachlorophthalic acid or anhydride in the polyester resin. Compositions so produced are chemically unrelated to the products of this invention; in addition they have only poor flame retardant properties and they usually possess low stability and low strength at elevated temperatures and are, therefore, not entirely satisfactory for many applications. Still other attempts involving the use of certain unsaturated organic phosphorus compounds as cross-linking agents which impart flame retardance to the final polyester resin have likewise been found unsatisfactory.

It is an object of this invention to provide resinous compositions which are highly resistant to burning and yet possess many of the desirable characteristics usually associated with polyester resins. A further object is to provide resinous compositions which are highly resistant to exposure at elevated temperatures. A still further object is to prepare resinous compositions which are suitable for casting, molding, foaming or laminating and which are characterized by possessing the desirable properties usually required in resins in the preparation of castings, moldings, foamed articles and laminates, and which are also characterized by being capable of forming articles of commerce which have a pleasing appearance and wide utility. A particular object of this invention is to make available in commerce compositions comprising a mixture of an unsaturated polyester and an olefinic cross-linking agent, with or without the presence of catalysts and/or inhibitors and/or chain terminating agents and/or promoters or accelerators, which are capable of polymerization to an insoluble, infusible, fire resistant polyester resin. A further objective is to provide methods for chemically combining hexahalocyclopentadienes in the form of an adduct into the polyesters. A still further objective is to provide methods for the preparation of these unsaturated polyesters and their combination with olefinic cross-linking agents. A further object is to provide a method for the introduction of a hexahalocyclopentadiene directly into a precondensed linear polyester which is the reaction product of a polycarboxylic compound and a polyhydric alcohol without the necessity for first forming an adduct of the hexahalocyclopentadiene with one of the components of the linear polyester or with the cross-linking compound. It is a further object to provide a method for the introduction of the hexahalocyclopentadiene directly into a polymer containing olefinic unsaturation. It is still a further object to provide a method for the introduction of hexahalocyclopentadiene directly into a high molecular weight material containing olefinic unsaturation, such as unsaturated oils, etc. These objects, and others will become apparent to those skilled in the art upon consideration of the specification and appended claims.

We have now found that a hexahalocyclopentadiene such as hexachlorocyclopentadiene, hexabromocyclopentadiene and mixed hexahalocyclopentadienes such as those containing chlorine and bromine, chlorine and fluorine, bromine and fluorine, etc., may be reacted with high molecular weight or polymeric materials containing aliphatic carbon-to-carbon unsaturation, such as ethylenic linkages whether conjugated or unconjugated, at temperatures below the degradation temperatures of the reactants and products produced, to yield halogen-containing high molecular weight materials or halogen-containing polymers.

The compositions of this invention can be prepared by the following method. First, a polycarboxylic acid is esterified with a polyhydric alcohol, at least one of which contains aliphatic carbon-to-carbon unsaturation. Then the hexahalocyclopentadiene is added and the mixture reacted together. The hexahalocyclopentadiene will undergo a Diels-Alder reaction with the reactive double bonds of the linear polyester to form an adduct thereof. The type of product formed can be controlled by varying the degree to which the reaction is carried out. For instance, if the reaction is stopped before all of the reactable double bonds of the linear polyester have been reacted upon by a molecule of the hexahalocyclopentadiene, the remaining unsaturation can be utilized for cross-linking the linear polyester. If the reaction is carried out until all of the double bonds of the linear polyester have reacted, the reaction product formed will be a thermoplastic linear polyester which cannot be further reacted.

Esterification of the desired ingredients may be effected in the presence of esterification catalyst and/or chain terminating agents, etc. A preferred procedure involves introducing the selected ingredients to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, an outlet, and any other accessories necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product is then chemically reacted with the hexahalocyclopentadiene only to a degree where some of the reactive double bonds of the linear polyester remain unreacted upon. The olefinic cross-linking agent is then added and, together with a polymerization catalyst, may be copolymerized with the mixture.

The high molecular weight materials or halogen-containing polymers obtained in accordance with this invention are characterized by heat and fire resisting properties, as well as chemical resistance. Such properties are of considerable value in industrial art for such uses as plastics, protective coatings, etc.

The reaction of hexahalocyclopentadiene with a high molecular weight or polymeric material containing aliphatic carbon-to-carbon unsaturation proceeds with the formation of a diene addition product of the hexahalocyclopentadiene with the unsaturated high molecular weight compound. The addition products are heat stable up to temperatures around 200 degrees centigrade or even higher and yet they readily decompose with the liberation of gaseous products at flame temperatures and exhibit fire resistant properties. Hence, such products show a very desirable property of thermal stability combined with fire resistance.

The location of the aliphatic carbon-to-carbon unsaturation in the high molecular weight material determines the place at which the reaction with the hexahalocyclopentadiene proceeds. By selection of high molecular weight materials wherein the unsaturation is located in different parts of the molecule, it is possible to obtain a variety of products. It is, for instance, possible to make high molecular weight materials, such as shown in examples below, to contain a specific number of double bonds separated by specific segments. By such means, high molecular weight materials are obtained which have controlled amounts of fire resistance, chemical resistance or other properties.

The reaction between the hexahalocyclopentadiene and the material containing carbon-to-carbon unsaturation can be brought to different degrees of completion. By doing so, the extent of both the halogen contained in the product as well as the residual aliphatic carbon-to-carbon unsaturation may be controlled. Where the residual aliphatic carbon-to-carbon unsaturated bonds still exhibit activity for polymerization reactions, even higher molecular weight compounds or cross-linked polymers can be obtained by the addition of a polymerizing monomer such as styrene, vinyl esters, acrylate esters, vinyl chloride, etc.

Among the high molecular weight or polymeric materials containing aliphatic carbon-to-carbon unsaturation, we include such naturally occurring materials as unsaturated vegetable or animal oils such as linseed, soya, tung, sesame, sun flower, cottonseed, herring, menhaden, and sardine oils, etc., or chemically modified naturally occurring materials such as allyl ethers of starch, cellulose, or acrylate esters thereof, etc., synthetic drying oils, polymers obtained by polyesterification of such unsaturated compounds such as maleic, fumaric, itaconic, aconitic, chloromaleic, dimerized fatty acids, anhydrides or acids or from allyl glycerol ether, methallylglycerol ether, glycerol monoacrylate, butenediol, pentenediol, or polymers obtained by polyetherification of the unsaturated polyols.

In carrying out the reactions embodied in this invention we commonly employ temperatures in excess of about 80 degrees centigrade, although temperatures below 80 degrees centigrade can be employed if the reaction times are extended. The reaction proceeds smoothly, the exotherms during reaction being in most cases only minor. The reaction is best carried out in the liquid phase, wherein the hexahalocyclopentadiene may act as a solvent for the high molecular weight aliphatic carbon-to-carbon unsaturated compound. Alternatively, an inert solvent such as benzene, chlorobenzene, or dibutyl ether can be employed. It has been found that if the amount of solvent is insufficient, there is a greater likelihood of forming cross-linked high molecular weight compounds than if the amount of solvent or excess hexahalocyclopentadiene is large. Upon reaching a desired extent of reaction, the excess hexahalocyclopentadiene or inert solvent can be removed by such means as distillation with or without steam, solvent stripping or other commonly known means. As is common with other chemical reactions, adequate agitation is desirable for improving the reaction rates.

If the carbon-to-carbon unsaturation of the high molecular weight material is susceptible to polymerization reactions, it is usually desirable to carry out the reaction with the hexahalocyclopentadiene in the presence of a small amount of a polymerization inhibitor such as hydroquinone, picric acid, phenylene diamine. This inhibitor may be retained or removed for further polymerization with monomers as desired. The polymerization of the hexahalocyclopentadiene-containing products with monomers is catalyzed by the conventional peroxidic catalysts, such as benzoyl peroxide, etc., or by ultra-violet light, heat, etc.

The maximum amount of hexahalocyclopentadiene which can be combined with the starting high molecular weight material is primarily determined by the latter's aliphatic carbon-to-carbon unsaturation content. However, the reaction can be stopped at any stage prior to completion of the reaction.

The utility of materials resulting from practicing this invention is further illustrated in the examples below.

The following examples are given to illustrate our invention. However, they are not to be construed as limiting the invention except as defined in the appended claims.

*Example 1*

Equimolar proportions of ethylene glycol and maleic anhydride were reacted at a temperature up to 220 degrees centigrade until a polymer having an acid number of approximately 125 was attained. The reaction mixture was cooled to about 130 degrees centigrade. One-half mole hexachlorocyclopentadiene per mole of maleic anhydride and 0.16 mole of hydroquinone per mole of maleic anhydride originally esterified were then blended into the reaction mixture. The reaction was continued at a temperature of 130 degrees centigrade for about eight hours, at the end of which time a fusible, acetone-and-benzene-soluble polyester resin was recovered having hexachlorocyclopentadiene chemically combined into the polyester chain, and also containing at least 50 percent of the original number of olefinic linkages still capable of entering into the cross-linking reaction. This was confirmed by mixing about 100 parts of the product with 30 parts of styrene to form a solution, and polymerizing the resinous solution by the addition of 1.3 parts of benzoyl peroxide as a polymerization catalyst, and by subsequently heating to a temperature of about 50 degrees centigrade. An infusible, insoluble, hard, tough, amber-colored material was obtained which was self-extinguishing on removal from an oxidizing flame.

The solution of the halogen-containing polymer and styrene produced above can be cast into a variety of molds and cured to form thermoset castings which are useful for a wide variety of applications. As examples, electrical components can be potted; plate material can be cast which has many desirable optical properties; or castings can be produced and subsequently machined into buttons, door-knobs, handles, etc. The solution can be used to impregnate glass fibers, in the form of mats, cloths, or strands; and upon curing, extremely high strength reinforced plastic materials are obtained which are suitable as building partitions, skylights, electrical cord, motor-car bodies, containers and for many other uses. If suitable foaming agents are added, cellular products are obtained which are strong, lightweight, and fire resistant.

*Example 2*

Ninety grams of linseed oil were placed in a reaction flask equipped with means for temperature control and temperature recording. To this were added 27.3 grams (0.1 mole) of hexachlorocyclopentadiene. The mixture contained in the flask was heated in an oil bath and the temperature of the reaction mixture was maintained at about 165 degrees centigrade for a period of two hours, after which time the reaction flask was removed from the hot oil bath and allowed to cool to room temperature.

The contents of the reaction flask was then subjected to a vacuum of 50 millimeters of mercury and heated to 135 degrees centigrade to 143 degrees centigrade. No distillate was obtained. The resulting product had no odor of hexachlorocyclopentadiene. The product so recovered was analyzed and found to be an addition product of hexachlorocyclopentadiene with linseed oil containing a chlorine content of 18.0 percent (theory 18.15), and an iodine value of 122 (theory 123). The product is useful for the preparation of chlorine-containing modified alkyds.

Such modified alkyds can be prepared by reacting the products of Example 4 with various polybasic acids or anhydrides such as phthalic or maleic anhydrides and with additional polyols such as glycerol, pentaaerythritol, etc. The resultant modified alkyd shows improved hardness, water resistance as well as fire resistant properties. It is useful in the preparation of water resistant, fire resistive lacquers, enamels and paints.

The addition product of hexachlorocyclopentadiene and linseed oil can also be used directly as an ingredient in oil modified alkyds or as plasticizer or extender of polymeric materials in order to improve such properties as water and fire resistance.

*Example 3*

To 2374.4 grams of allyl glycerol ether in a three-necked round-bottom flask was added 2625.6 grams of adipic acid. The flask was fitted with a stirrer, nitrogen bubbling tube, thermometer and distilling head. The flask was then lowered into an oil bath and heated at 161 to 166 degrees centigrade with stirring and passage of nitrogen while reaction was taking place. When an acid number of 72 had been reached the reaction mix was removed from the flask and poured into trays.

The product was a light amber colored polyester resinous in nature and completely thermoplastic.

*Example 4*

To 15.0 grams of the allyl glycerol ether adipate resin from Example 3 was added 2.6 grams of hexachlorocyclopentadiene and 0.088 gram (0.5%) of hydroquinone. The mixture was placed in a one-inch by six-inch test tube and heated at 125–130 degrees centigrade under a very slow stream of nitrogen for 64 hours. The product was an amber liquid containing 11.5 percent of chlorine.

It was dissolved in 10 grams of styrene. This mixture was catalyzed by 0.2 gram of Luperco ATC (50% paste of benzoyl peroxide in tricresyl phosphate). The solution was heated at 80 degrees centigrade and cured to a tough thermoset product which was fire retardant. The uses of the product are similar to those of Example 1.

From a consideration of the foregoing examples it is apparent that various modifications may be made falling within the scope of this invention without departing from the spirit and intent thereof. For instance, although we have chosen to exemplify our invention in detail by using hexachlorocyclopentadiene, other hexahalocyclopentadienes, and mixed hexahalocyclopentadienes may be substituted therefore without adversely affecting the properties thereof.

We claim:

1. The process which comprises reacting hexahalocyclopentadiene wherein the halogen is selected from the group consisting of chlorine, bromine, fluorine and mixtures thereof with a material selected from the group consisting of (1) aliphatic unsaturated linear polyesters of a polyhydric alcohol and a polycarboxylic compound selected from the group consisting of polycarboxylic acids and polycarboxylic anhydrides, and (2) glyceride drying oils.

2. The process of claim 1 wherein the hexahalocyclopentadiene is hexachlorocyclopentadiene.

3. The process of claim 1 wherein the material is a drying oil.

4. The process of claim 3 wherein the drying oil is linseed oil.

5. The process of claim 3 wherein the drying oil is soya bean oil.

6. The process of claim 1 wherein the material is an unsaturated linear polyester resin.

7. The process of claim 6 wherein the ratio of hexahalocyclopentadiene to unsaturated linear polyester resin is less than the theoretical required to react with all of the unsaturation in said polyester.

8. The process which comprises reacting hexachlorocyclopentadiene with less than the total number of unsaturated aliphatic carbon-to-carbon linkages contained in an aliphatic unsaturated linear polyester of a polyhydric alcohol and a polycarboxylic compound selected from the group consisting of polycarboxylic acids and polycarboxylic anhydrides to produce an unsaturated polyester resin containing the hexachlorocyclopentadiene in chemical combination therewith.

9. The process which comprises reacting hexachlorocyclopentadiene with less than the total number of unsaturated aliphatic carbon-to-carbon linkages contained in an aliphatic unsaturated linear polyester of a polyhydric alcohol and a polycarboxylic compound selected from the group consisting of polycarboxylic acids and polycarboxylic anhydrides to produce a polyester resin containing the hexachlorocyclopentadiene in chemical combination therewith, mixing said product with a copolymerizable compound containing carbon-to-carbon unsaturation, and effecting the polymerization of the mixture until an insoluble, infusible polyester resin is produced.

10. A composition of matter comprising a polymerizable linear polyester which is the reaction product of (1) a hexahalocyclopentadiene, wherein the halogen is selected from the group consisting of chlorine, bromine, fluorine and mixtures thereof, and (2) a material selected from the group consisting of (1) aliphatic unsaturated linear polyesters of a polyhydric alcohol and a polycarboxylic compound selected from the group consisting of polycarboxylic acids and polycarboxylic anhydrides, and (2) glyceride drying oils.

11. A composition of matter comprising a polymerizable linear polyester which is the reaction product of (1) a hexahalocyclopentadiene wherein the halogen is selected from the group consisting of chlorine, bromine, fluorine and mixtures thereof, and (2) an aliphatic unsaturated linear polyester of a polyhydric alcohol and a polycarboxylic compound selected from the group consisting of polycarboxylic acids and polycarboxylic anhydrides.

12. A composition of claim 11 wherein said hexahalocyclopentadiene (1) is hexachlorocyclopentadiene.

13. A polymerizable mixture comprising the composition of claim 12 in admixture with (B) a polymerizable compound containing aliphatic carbon-to-carbon unsaturation.

14. A composition of claim 13 wherein said polycarboxylic compound is maleic acid.

15. A composition of claim 13 wherein said polycarboxylic compound is maleic anhydride.

16. A composition of claim 13 wherein said polyhydric alcohol is a glycol, said polycarboxylic compound is maleic acid, and said polymerizable compound (B) is styrene.

17. A composition of matter comprising the reaction product of hexachlorocyclopentadiene with glyceride a drying oil.

18. A composition of matter comprising the reaction product of hexachlorocyclopentadiene with linseed oil.

19. A process for the production of a polymerizable mixture which comprises (1) reacting a polyhydric alcohol with a polycarboxylic compound containing aliphatic carbon-to-carbon unsaturation selected from the group consisting of polycarboxylic acids and polycarboxylic anhydrides, (2) reacting the condensation product thus formed with a hexahalocyclopentadiene at an elevated temperature, (3) and adding a polymerizable compound containing aliphatic carbon-to-carbon unsaturation to the reaction product formed in step (2).

References Cited in the file of this patent

UNITED STATES PATENTS

| | | |
|---|---|---|
| 2,404,836 | Gerhart et al. | July 30, 1946 |
| 2,475,664 | Gerhart et al. | July 12, 1949 |
| 2,598,424 | Peters | May 27, 1952 |
| 2,606,910 | Herzfeld et al. | Aug. 12, 1952 |
| 2,779,701 | Robitschek et al. | Jan. 29, 1957 |

UNITED STATES PATENT OFFICE
CERTIFICATE OF CORRECTION

Patent No. 2,863,848                 December 9, 1958

Paul Robitschek et al.

It is hereby certified that error appears in the above numbered patent requiring correction and that the said Letters Patent should read as corrected below.

Column 7, line 21, for "glyceride a" read -- a glyceride --.

Signed and sealed this 10th day of August 1965.

(SEAL)
Attest:

ERNEST W. SWIDER
Attesting Officer

EDWARD J. BRENNER
Commissioner of Patents